Oct. 30, 1956 L. M. DOORMANN 2,768,672
METHOD TO INSULATE COMPARTMENTS AND MAINTAIN A UNIFORM
TEMPERATURE IN AUTOMOBILES AND OTHER TRANSPORTS
Filed March 2, 1954
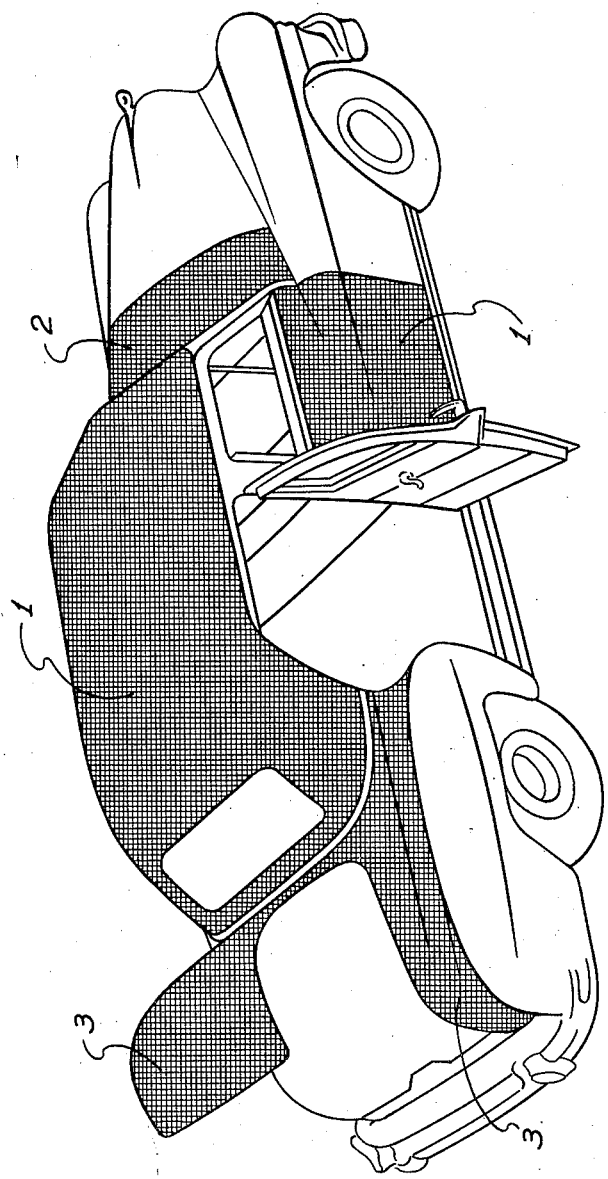
INVENTOR
LUZ MALVIDO VDA. DE DOORMANN
BY

United States Patent Office 2,768,672
Patented Oct. 30, 1956

2,768,672

METHOD TO INSULATE COMPARTMENTS AND MAINTAIN A UNIFORM TEMPERATURE IN AUTOMOBILES AND OTHER TRANSPORTS

Luz Malvido Doormann, Mexico City, Mexico

Application March 2, 1954, Serial No. 413,689

2 Claims. (Cl. 154—28)

This invention relates to a method for insulating compartments, particularly in all kinds of vehicles, i. e., automobiles, railroad cars, omnibuses and other similar transports; especially referring to the sun heat and likewise to cold weather.

It will be understood from the above that one of the objects of this invention is to provide a method to insulate compartments used in the construction of automobiles, railroad cars, omnibuses and other similar transports, protecting either partially or totally, the walls of said compartments, mainly those made of metallic sheets.

Another object of this invention is to provide a method to protect metallic sheets so as to form a barrier to undue heat and/or cold, also undue, by the use of so protected walls, temperature conditioned compartments can be assured.

As it is well known, the inside temperature of automobiles, omnibuses, railroad cars and other transports of metallic construction, is very extreme, due to the fact that the metallic sheets forming the walls of such compartments, especially the roofs, are highly sensitive to the heat, which means that when the vehicle is exposed to the sun rays, the inside of compartments are subject to a rise in the temperature and, on the contrary, when the vehicle remains for a long time in the shade, loses its heat and is subject to an appreciable fall in the temperature.

The method, subject of the explanation of my invention consists substantially in the application of a layer of adequate thickness of the material known as asbestos, to the sheets forming the compartments of any vehicle, mainly to the parts where the sheets, during the normal use of the vehicle, are exposed to the sun rays for long periods of time, as, for example, the sheets forming the roof of the body. The application of the asbestos layer is done by completely spreading a thin coat of tar to the surface of the asbestos layer that contacts the metal sheets to be protected, taking care, however, to leave a marginal zone open around the asbestos layer, which, on its opposite side, is totally covered with gummed paper or cloth, the edge of which is attached to the marginal zone not covered with tar, thus giving it more strength and prevent vibrations from loosening or detaching it.

For a better understanding, the drawing will serve to illustrate it, where an automobile is shown, indicating the parts to be protected by the method of this invention, to properly insulate the various compartments of the vehicle, particularly those for passengers and baggage.

In this drawing, the shaded parts 1, indicate the metallic sheets, whose interior surface has been protected by the method herein described, to insulate the passengers' compartment. The shaded parts 2, indicate the metallic sheets protected by this method, to insulate the front compartment for passengers, where usually the legs are placed, including the glove compartment to be found at the right hand side of the dash-board, and last, the shaded portions 3 indicate the metallic sheets treated by this method to insulate the baggage compartment.

To further explain this method, it must be said that where it is applied to an automobile, it is advisable that the asbestos layer be of an approximate thickness of 0.787" and that the peripheric margin of the asbestos layer, to be left open without tar, be approximately ¾".

Having thus described my invention, what I claim as new is:

1. The method of insulating vehicle bodies formed of sheet metal which comprises providing a thin layer of asbestos conforming in shape to the section of the body to which it is to be applied and of a size slightly smaller than such section, applying a thin coating of tar to one side of the asbestos layer and applying the coated side of the layer to the inner side of the body section leaving a narrow marginal zone of the section uncovered by the layer and tar, and securing a sheet material to the inner surface of the asbestos layer and to the uncovered marginal zone of the body section.

2. The method set forth in claim 1 wherein the asbestos layer is provided with an approximate thickness of 0.787 inch and the marginal zone is provided with a width of approximately ¾ of an inch.

References Cited in the file of this patent

UNITED STATES PATENTS

| | | |
|---|---|---|
| 1,116,351 | Evans | Nov. 3, 1914 |
| 1,845,444 | Sawyer | Feb. 16, 1932 |
| 1,926,737 | Blum | Sept. 12, 1933 |
| 2,106,792 | Bruce et al. | Feb. 1, 1938 |